United States Patent
Eberhardt et al.

(10) Patent No.: US 7,140,391 B2
(45) Date of Patent: Nov. 28, 2006

(54) MULTIWAY VALVE

(75) Inventors: Hans-Frieder Eberhardt, Giengen-Burgberg (DE); Rolf Kordon, Giengen (DE); Michael Neumann, Ulm (DE); Udo Wenning, Giengen/Brenz (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/873,524

(22) Filed: Jun. 21, 2004

(65) Prior Publication Data

US 2005/0005980 A1   Jan. 13, 2005

Related U.S. Application Data

(63) Continuation of application No. PCT/EP02/14175, filed on Dec. 12, 2002.

(30) Foreign Application Priority Data

Dec. 19, 2001   (DE)   ................. 101 62 498

(51) Int. Cl.
*F16K 11/065* (2006.01)
(52) U.S. Cl. .............. 137/625.48; 251/11; 60/527
(58) Field of Classification Search ......... 137/625.48; 251/11; 60/527, 528
See application file for complete search history.

(56) References Cited

U.S. PATENT DOCUMENTS

| | | | |
|---|---|---|---|
| 537,593 A * | 4/1895 | Womersley et al. | 251/30.05 |
| 3,460,572 A * | 8/1969 | Hartman | 137/625.48 |
| 4,078,579 A * | 3/1978 | Bucko, Sr. | 137/625.48 |
| 4,493,435 A | 1/1985 | Hartley | |
| 4,736,587 A * | 4/1988 | Suzuki | 60/528 |
| 4,772,807 A | 9/1988 | Bouvot | |
| 4,887,430 A * | 12/1989 | Kroll et al. | 60/527 |
| 4,973,024 A | 11/1990 | Homma | |
| 5,083,439 A * | 1/1992 | Orner et al. | 62/187 |
| 5,189,991 A | 3/1993 | Humburg | |
| 5,318,268 A | 6/1994 | Cox et al. | |

FOREIGN PATENT DOCUMENTS

| | | |
|---|---|---|
| DE | 198 22 735 A1 | 11/1999 |
| GB | 1 226 481 | 3/1971 |

* cited by examiner

*Primary Examiner*—John Fox
(74) *Attorney, Agent, or Firm*—Craig J. Loest; Russell W. Warnock

(57) ABSTRACT

A multiway valve contains a housing having several inlets and outlets and a chamber. Several seats are provided and each is respectively associated with one inlet or one outlet. A closure element is provided which can move between the seats and at least one actuator is provided in the form of an element made of a form memory alloy, able to displace the closure element from one of the seats when heating occurs. A spring element presses the closure element against each respective seat that it engages.

8 Claims, 3 Drawing Sheets

MULTIWAY VALVE

CROSS-REFERENCE TO RELATED APPLICATION

This application is a continuation, under 35 U.S.C. § 120, of copending international application No. PCT/EP02/14175, filed Dec. 12, 2002, which designated the United States; this application also claims the priority, under 35 U.S.C. § 119, of German patent application No. 101 62 498.0, filed Dec. 19, 2001; the prior applications are herewith incorporated by reference in their entirety.

BACKGROUND OF THE INVENTION

Field of the Invention

The present invention relates to a multiway valve and to a refrigerating machine in the circuit of which such a multiway valve is inserted.

Such multiway valves or refrigerating machines are used, for example, in refrigerators that have a plurality of cooling compartments capable of being regulated in each case by a specific evaporator to temperatures which can be set independently of one another; they serve there for apportioning the refrigerant stream to one or more evaporators. The multiway valves used at the present time in refrigerating machines are generally solenoid valves. These have a housing with a plurality of valve seats and with a closing member movable between stable positions, in each case on one of the valve seats, by a magnetic force.

A solenoid valve, not actuated magnetically, is known from Published, Non-Prosecuted German Patent Application DE 198 22 735 A1. The housing of the known multiway valve contains three chambers, including a middle chamber, in which a closing member is movable between two seats on opposite side walls, and two lateral chambers, into which the orifices of the valve seats issue and in which a spring formed of a form memory alloy is accommodated in each case. The two springs press onto the closing member in the middle chamber in each case via a piston and a rod extending through the orifice of the respective valve seat. By a first of the two lateral chambers being heated, the spring located in it is lengthened and presses the closing member against the valve seat leading to the second lateral chamber, at the same time compressing the spring in the second lateral chamber.

The adjusting movement of the closing member between the two mutually opposite valve seats is, in this known multiway valve, driven solely by the springs formed of form memory alloy. For this purpose, the spring has to be capable of generating considerable stroke which will generally be greater than the distance between the two valve seats, since, in order to release the closing member from a seat, the spring disposed in the chamber lying behind it must first build up the necessary pressure in order to overcome a pressure difference possibly applied to the initially still closed valve seat and, finally, to press the closing member against the opposite seat with a spring force which does not disappear. Moreover, the resistance of the spring in the opposite lateral chamber has to be overcome.

So that the closing member can be pressed with a predetermined force against the valve seat of the opposite chamber, the spring must be configured in such a way that, when the closing member bears against the opposite valve seat, the spring is shorter by the amount of a displacement distance δL than in its free relaxed state. The displacement distance δL is smaller than the length difference ΔL of the spring between the compressed state and the free relaxed state. The fatigue phenomena of the spring, which may occur in the case of long-term use, may lead to a reduction in the length of the spring in the free relaxed state, with the result that δL becomes zero or even negative and the stroke necessary for displacing the closing member toward the opposite valve seat can no longer be applied.

SUMMARY OF THE INVENTION

It is accordingly an object of the invention to provide a multiway valve which overcomes the above-mentioned disadvantages of the prior art devices of this general type, which can be changed over with the aid of an element formed of a form memory alloy and where the closing member of the multiway valve is pressed reproducibly, with a constant force independent of fatigue phenomena of an element formed of form memory alloy, against the valve seat occupied in each case.

With the foregoing and other objects in view there is provided, in accordance with the invention, a multiway valve. The multiway valve contains a housing having a plurality of inlets and outlets and at least one common chamber. A plurality of seats are provided and each is associated with one of the inlets or outlets. A closing member is movable between the seats and is disposed in the housing. At least one actuator being an element formed of a form memory alloy, is provided. The element is capable, under heating, to displace the closing member onto one of the seats. A spring element is provided for pressing the closing member against each of the seats occupied by the closing member in each case.

The spring element independent of an actuator may be produced from any desired spring-elastic material with better long-term stability than that of the form memory alloy. Materials of this kind, in particular spring steels, are available to a person skilled in the art. During the changeover of the multiway valve according to the invention, when the closing member is displaced from a seat, an actuator initially acts counter to the resistance of the spring element. Finally, in this case, a point of equilibrium is exceeded, from which the force of the spring element begins to press the closing member against another seat. From this point of equilibrium, therefore, the spring element assumes the drive of the movement of the closing member, and the force with which the closing member is pressed against the respective valve seat is applied by the spring element. How great is the force which the actuator formed of form memory alloy is still capable of exerting on the closing member at the point of equilibrium and how far the actuator is deformed until it reaches a position of rest are unimportant for the functioning capacity of the valve according to the invention. This force can therefore be dimensioned generously on a new valve, so that it is certain that it does not become zero due to fatigue.

The spring element used is preferably a leaf spring.

As a result of a preferred refinement of the invention, the closing member is movable between two seats facing one another, and the leaf spring is capable of assuming two stable positions, a convex curvature of the leaf spring facing one of the seats in each of the positions.

The actuator used is preferably a curved body with a convex side facing the closing member, the body being lengthened under heating. Such heating leads, in the case of retained ends of the body, to an increase in curvature and consequently to a movement of the convex side in the direction of the closing member, as a result of which the closing member can be displaced from its seat. The curved body may have, in particular, a plate or beam shape.

According to a preferred refinement, the multiway valve has a housing with a central chamber, in which the closing member is movable, and at least one peripheral chamber. Each peripheral chamber receives an actuator and is capable of communicating with the central chamber via an orifice surrounded by one of the seats. A transmission pin for transmitting a deformation of the actuator to the closing member extends through the orifice.

In an alternative refinement, the spring element and the at least one actuator are accommodated in a common chamber. In this case, the actuator is expediently disposed between a sidewall of the housing and the spring element, the sidewall having located in it that seat from which the actuator can displace the closing member.

In this refinement, the actuator preferably has an orifice through which the closing member can be moved in order to close or open the seat.

For the selective heating of each actuator, the latter is in each case assigned an electrical heating device. The heating device is preferably a heating resistor that extends on the surface of the actuator. The configuration makes it possible to bring the heating device into direct contact with fluid which flows through the valve and thus to cool the actuator quickly again after its actuation. This is expedient so that the multiway valve can be operated with high switching frequency.

It is simpler and more cost-effective to dispose a heating device outside the housing than to dispose a heating device on the surface of the actuator. So that, in this refinement, too, a rapid heating of an actuator can be achieved, it is expedient for the housing of the multiway valve and the actuator to be constructed in one piece from a form memory alloy, in order thereby to minimize heat transmission resistances between the housing part heated by the heating device and the actuator.

The subject of the invention is, furthermore, a refrigerating machine with a refrigerant circuit having a plurality of evaporators, in which refrigerating machine a multiway valve of the above-defined type for apportioning refrigerant to the various evaporators is disposed in the refrigerant circuit of the machine.

Other features which are considered as characteristic for the invention are set forth in the appended claims.

Although the invention is illustrated and described herein as embodied in a multiway valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
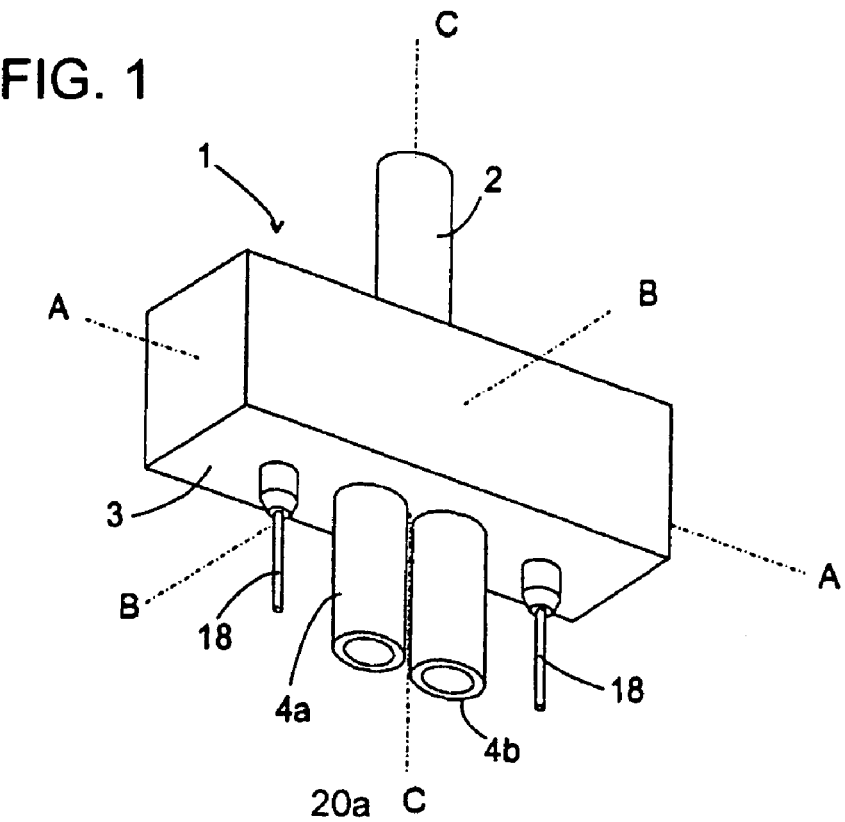
FIG. 1 is a diagrammatic, perspective view of a first embodiment of a multiway valve according to the invention.

Referring now to the figures of the drawing in detail and first, particularly, to FIG. 1 thereof, there is shown a multiway valve according to the invention with a housing 1 formed of metal, which on one housing side, here the top side facing away from the viewer, has an inlet connection 2 and, on an opposite housing underside 3, two outlet connections 4a, 4b for a fluid. Two current leadthroughs 18 are likewise led on the underside 3 into an interior of the housing 1 so as to be insulated relative to the latter. A ground connection is connected directly to the housing at any desired point and is not illustrated in FIG. 1.

Figure 2:
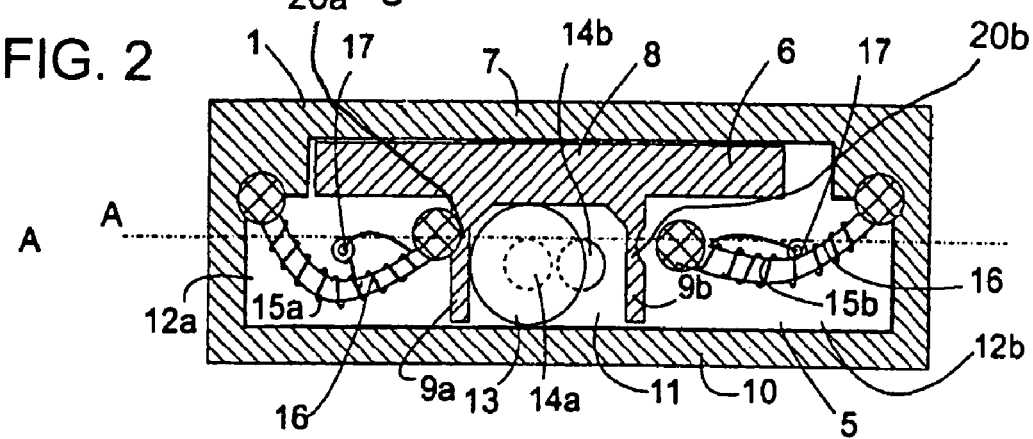
FIG. 2 is a diagrammatic, sectional view through the multiway valve of FIG. 1 taken along the plane defined by lines A, B in FIG. 1.

FIG. 2 shows a "horizontal" section through the multiway valve of FIG. 1 in the plane defined by the lines A, B of FIG. 1. A slide 6 formed of an electrically nonconductive material, for example plastic, is mounted displaceably in the direction of the line A in a chamber 5 inside the housing 1. The slide 6 contains a base plate 8 guided displaceably on a side wall 7 of the housing 1 and two legs 9a, 9b which, starting from the base plate 8, extend as far as a short distance from the opposite side wall 10 of the housing. The legs 9a, 9b subdivide the chamber 5 into a central chamber 11 between the two legs 9a, 9b and two lateral chambers 12a, 12b in each case on the far side of the legs 9a, 9b.

A ball 13 functioning as a closing member is accommodated in the central chamber 11. In the configuration of the multiway valve, as shown in FIG. 2, the ball 13 lies centrally on a left valve seat 14a formed on the bottom of the chamber 5 and thus shuts off the outlet connection 4a assigned to the valve seat 14a (see also FIG. 3). A second right valve seat 14b, which belongs to the right outlet connection 4b, is open.

The two lateral chambers 12a, 12b accommodate elements 15a, 15b which are formed of a form memory alloy, here in the form of curved bars, and which are in each case held at one end on the housing 1. A second end of the left element 15a is in bearing contact in a recess 20a on the left leg 9a, and a corresponding second end of the right element 15b lies opposite such a recess 20b, without reaching it. The element 15b, which is in the memory configuration corresponding to a hot state, is thus fully relaxed. However, the memory configuration can also be selected such that the end of the element 15b just reaches the clearance 20b or presses against the latter with a slight residual force. Around each element 15a, 15b is wound a resistance wire 16 which is connected, at its end facing the leg 9a or 9b, to a conductor 17 of one of the leadthroughs 18 and the opposite end of which is connected to ground via the housing 1.

Figure 3:
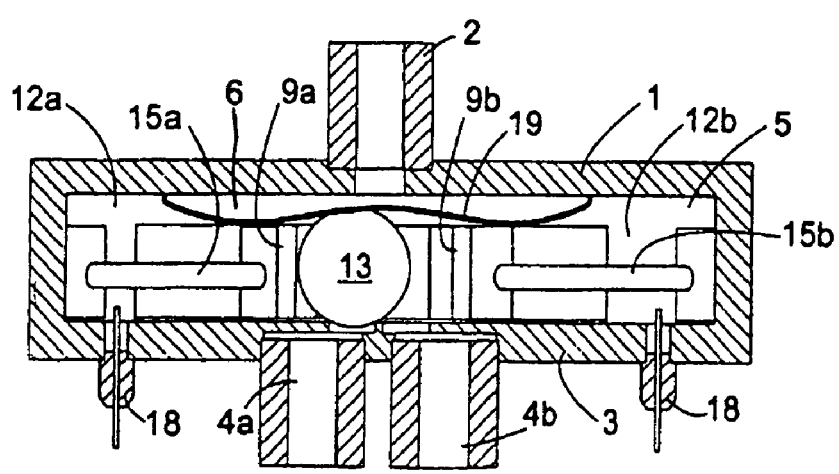
FIG. 3 is a diagrammatic, sectional view taken along the plane defined by lines A, C in FIG. 1.

FIG. 3 shows a section through the multiway valve of FIG. 1 in the plane defined by the lines A, C in FIG. 1. A height of the slide 6 is smaller than the diameter of the ball 13, and a leaf spring 19 clamped above the slide 6 between the ball 13 and the top side of the housing 1 exerts on the ball 13 a downwardly directed force which keeps the ball 13 pressed firmly against the seat occupied in each case by it, here the seat 14a.

When the element 15a is heated with the aid of its resistance wire 16, it stretches out and at the same time displaces the slide 6 to the right. In this case, the left leg 9a displaces the ball 13 from its place on the left valve seat 14a. During the displacement, the ball 13 is lifted, counter to the downwardly directed force exerted by the leaf spring 19, until it assumes an unstable position of equilibrium between the two valve seats 14a, 14b. When the ball 13 has overcome this position of equilibrium, the force of the leaf spring 19 drives it in the direction of the right valve seat 14b, and, as a result of the movement of the ball 13, the slide 6 is released from the element 15a and driven along. The element 15a, which then no longer has any work to perform, can stretch out further, until it assumes the configuration of equilibrium corresponding to its hot state. When the slide 6 butts with its clearance 20b onto the element 15b, it deforms the latter, driven by the force of the leaf spring 19, until the ball has reached the right valve seat 14b. Since the element 15b is cold, the force to be applied for this deformation is substantially lower than the force that the heated element 15a applied in order to displace the ball 13 as far as the point of equilibrium.

The force with which the ball 13 is pressed against the valve seat 14b is determined by the force of the spring 19 and, if appropriate, by a pressure falling at the valve seat. It is independent of the exact value of the force supplied by the element 15a. Fatigue or other drift in the behavior of the element 15a therefore has no effect on the closing force acting on the ball 13, as long as the force of the element 15a is sufficient to force the ball 13 beyond the position of equilibrium.

Figure 4:
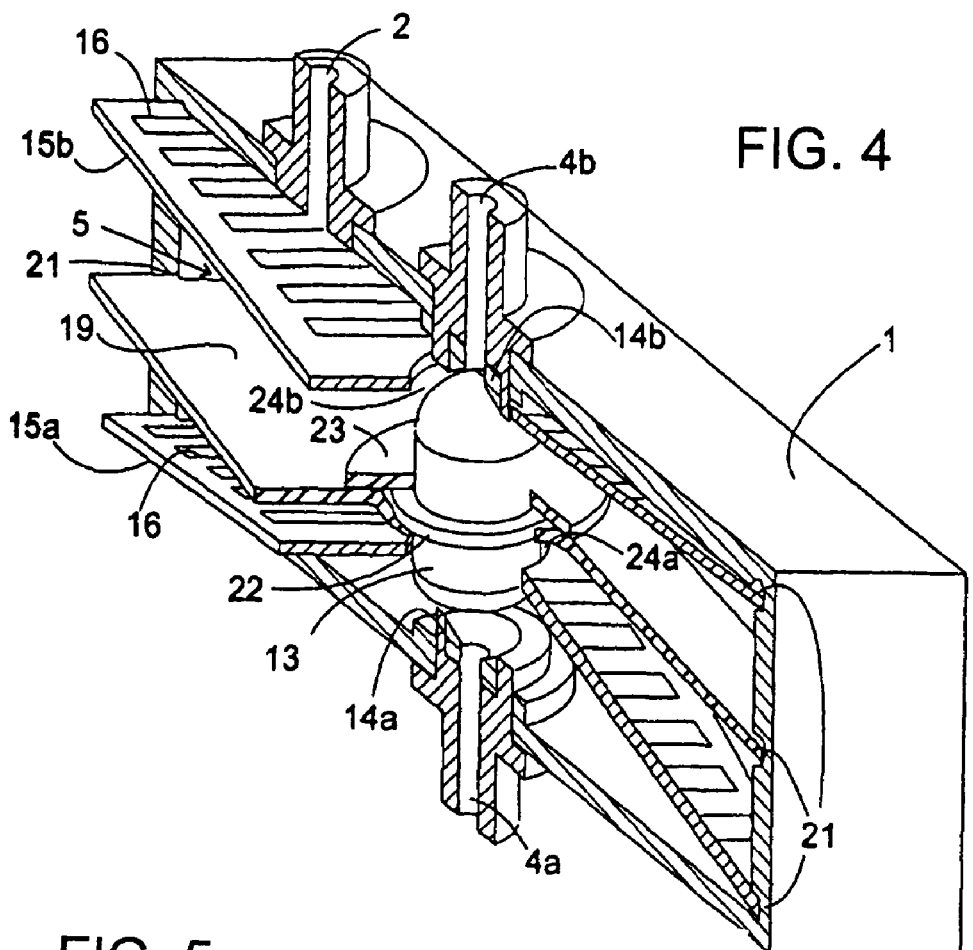
FIG. 4 is a diagrammatic, perspective, partially cutaway view of a second embodiment of the multiway valve according to the invention.

FIG. 4 shows a perspective view of the multiway valve according to a second embodiment of the invention, with a cutaway housing 1. The closing member 13 is movable in the chamber 5 of the housing between the two valve seats 14a, 14b which belong to the two outlet connections 4a and 4b disposed opposite one another on an underside and a topside of the housing 1 respectively. The closing member 13 is essentially in the form of a cylinder with rounded end faces. The closing member 13 is fastened in a central passage of the leaf spring 19 via a peripheral bead 22 which is clamped between the top side of the leaf spring 19 and a holding ring 23 fastened to the leaf spring 19, for example by spot welding. The leaf spring 19 extends over the entire length of the chamber 5 and is held at two ends in grooves 21 which extend over two narrow sides of the chamber 5 which are located opposite one another.

FIG. 4 shows the leaf spring 19 in an upwardly curved state, that is to say the convex side of the leaf spring 19 faces the valve seat 14b on the top side of the housing 1, and the leaf spring 19 presses the closing member 13 against the seat 14b in order to close the latter.

Two plate-shaped elements 15a, 15b formed of form memory alloy are disposed in the chamber 5 in each case above and below the leaf spring 19 and, like the latter, are held in grooves 21 on the narrow sides of the chamber. The elements 15a, 15b in each case have a central orifice 24a, 24b, through which the closing member 13 can engage in order to close the valve seat 14a or 14b assigned to the element 15a or 15b.

A resistance wire 16 extends in a zigzag over the surfaces of the elements 15a, 15b. It may extend over the topside and the underside of each element 15a, 15b or over only one of the two sides in each case. The resistance wire 16 of each element 15a, 15b can be acted upon by current independently of the other element 15b, 15a, in order to heat the respective element selectively.

When, in the configuration shown in FIG. 4, the resistance wire 16 of the upper element 15b is supplied with current, the element 15b is lengthened, and, since it is held at its longitudinal ends in the grooves 21, the lengthening has the result that the central element region surrounding the orifice 24b moves downward and presses the leaf spring 19 downward. The leaf spring 19 thereby comes increasingly under tension, and, as soon as a point of equilibrium at mid-height of the chamber 5 is overcome, the leaf spring 19 moves abruptly downward, at the same time deforming the lower element 15a, and the closing member 13 impinges onto the seat 14a and closes the latter. As soon as, after the changeover of the valve has taken place, the supply of heating current to the element 15b is discontinued, the latter cools rapidly in the stream of fluid flowing from the inlet connection 2 through the chamber 5 to the outlet connection 4b. The element 15a can then be supplied with heating current, and the operation described above takes place in the opposite direction.

Figure 5:
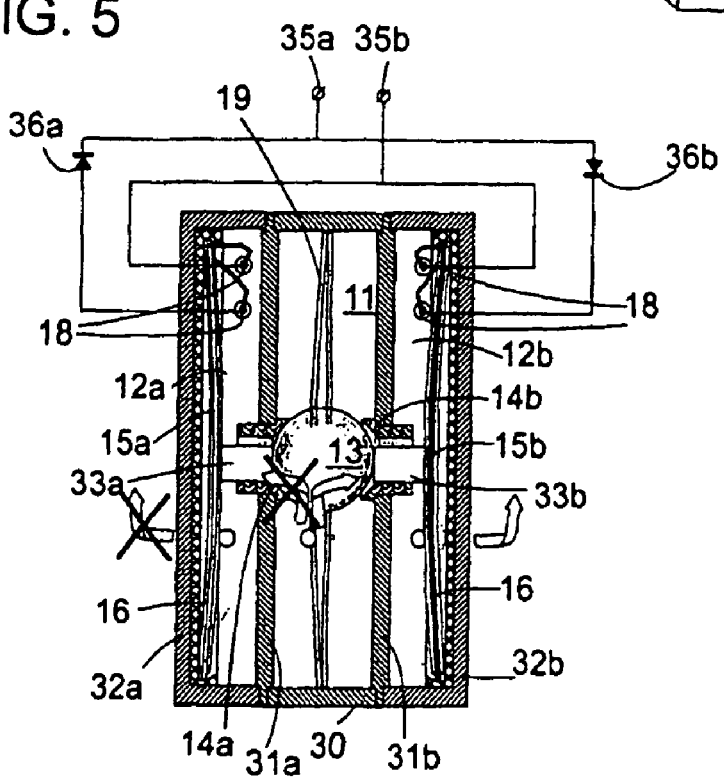
FIG. 5 is a diagrammatic, sectional view through a third embodiment of the multiway valve.

FIG. 5 shows a third embodiment of the valve according to the invention in section. The housing 1 is assembled, here, from a plurality of parts, a central frame 30, two intermediate walls 31a, 31b and two side parts 32a, 32b. The frame 30 and the two intermediate walls 31a, 31b delimit a central chamber 11 of the valve, in which the closing member 13, spherical again here, is held on the leaf spring 19. As in the example of FIG. 4, the leaf spring 19 has two stable states, in each case with an opposite curvature, in which it presses the closing member 13 in each case against one of two valve seats 14a, 14b which, lying opposite one another, are disposed in the intermediate walls 31a, 31b.

The intermediate walls 31a, 31b, together with the side parts 32a, 32b, delimit in each case lateral chambers 12a, 12b of the multiway valve in which an element 15a, 15b formed of form memory alloy extends. As in the example of FIG. 4, the elements 15a, 15b are in the form of rectangular plates, two opposite edges of which are clamped on walls of the lateral chambers 12a, 12b in such a way that the elements 15a, 15b have a curvature with the convex side facing the closing member 13. A heating resistor 16 is applied to the front and the rear side of the elements 15a and 15b.

Two transmission pins 33a, 33b extend through orifices, surrounded by the valve seats 14a, 14b, of the intermediate walls 31a, 31b between the elements 15a and 15b and the closing member 13.

FIG. 5 shows the leaf spring 19 in a state curved to the left, in which it keeps the closing member 13 pressed against the left valve seat 14a. When, in this configuration of the valve, the left element 15a is heated and therefore increases its length, this leads to an increase in its curvature, so that the closing member 13 is displaced from the seat 14a via the transmission pin 33a. After passing through the position of equilibrium in the middle of the central chamber 11, the curvature of the leaf spring 19 tips to the right, as a result of which the element 15b in the right lateral chamber 12b is compressed via the transmission pin 33b and the closing member 13 shuts off the seat 14b.

The resistance wires 16 of the two elements 15a, 15b are supplied jointly with heating current via two connections 35a, 35b.

The connection 15a is connected to a first current leadthrough 18 of the left lateral chamber 12a via a first diode 36a and to a first current leadthrough 18 of the right lateral chamber 12b directly. The connection 35b is connected to a second current leadthrough 18 of the left lateral chamber 12a directly and to a second current leadthrough 18 of the right lateral chamber 12b via a second diode 36b. The diodes 36a, 36b are connected antiparallel, so that, depending on the sign, a heating current applied to the connections 35a, 35b supplies only the resistance wire 16 of the element 15a or that of the element 15b.

The valves according to FIGS. 1 to 3 and 4 may, of course, also be supplied with current via antiparallel diodes 36a, 36b.

Figures 6, 7:
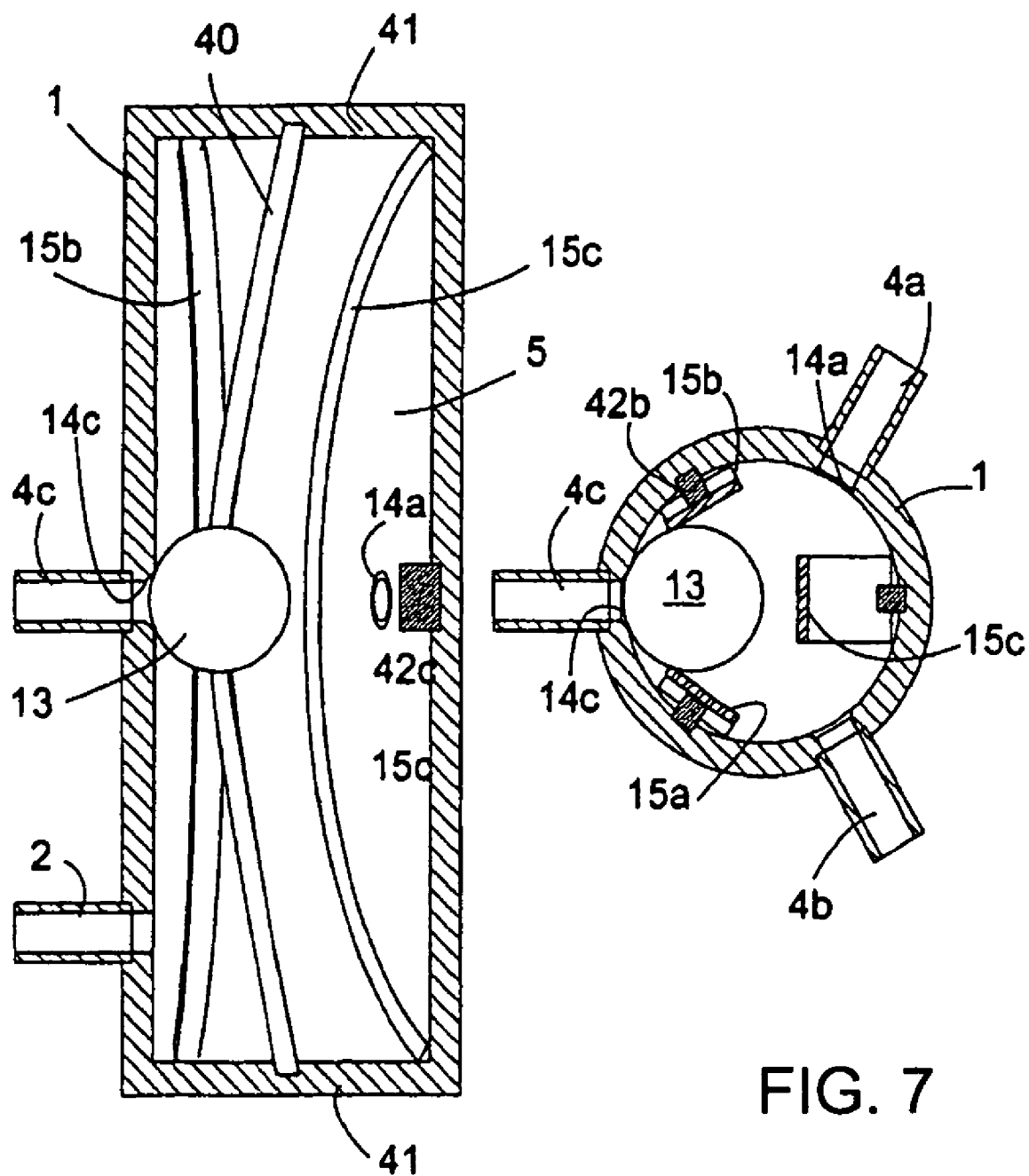
FIG. 6 is a diagrammatic, axial section view through the multiway valve according to the invention with three outlets.
FIG. 7 is a diagrammatic, sectional view through the multiway valve of FIG. 6 perpendicularly to its axis.

A fourth embodiment of the invention is described with reference to FIGS. 6 and 7. The multiway valve according to the fourth embodiment has a cylindrical housing 1 which is shown in a section along the axis in FIG. 6 and in a section transversely to the axis in FIG. 7.

The housing has three outlet connections 4a, 4b, 4c which are disposed in each case at intervals of 120° about the axis. An inlet connection 2 may be placed at essentially any desired point on the housing 1. A beam-shaped spring element 40 is held by an upper and lower wall 41 of the housing in each case at the intersection points of the walls 41 with the longitudinal axis. The spring element 40 is longer than the chamber 5 delimited by the walls 41 and runs, curved, through the chamber 5. Fastened central to the spring element 40 is a spherical closing member 13 that, in the position shown in the FIGS. 6 and 7, shuts off the valve seat 14c of the outlet connection 4c.

Strip-shaped elements 15a, 15b, 15c formed of form memory alloy are disposed in each case between two outlet connections at an angular interval of 60° of these in the chamber 5. The element 15c located opposite the outlet connection 4c is shown in an elongated state engaging into the interior of the chamber 5; the elements 15a, 15b adjacent to the outlet connection 4c are compressed, so that they do not obstruct the access of the closing member 14 to the valve seat 14c. When one of the compressed elements, for example the element 15a, is heated with the aid of a heating resistor, not illustrated, attached to its surface, it begins to curve toward the axis of the housing and at the same time to displace the closing member 13 from the valve seat 14c counter to the resistance of the spring element 40 and push it toward the surface of the element 15b. In order in this case to prevent an excessive compression of the element 15b, the rear side of the latter has disposed on it a supporting body 42b that prevents the element 15b from being compressed beyond its position shown. As soon as the element 15a has displaced the closing member over more than half the excursion toward the valve seat 14a located opposite it counter to the force of the spring element 40, the spring element 40 begins to assist the further movement of the closing body 13 and pushes the latter against the seat 14a, at the same time compressing the element 15c. Each of the three elements 15a, 15b, 15c is thus capable of displacing the closing member 13 from the two valve seats adjacent to it and of closing the opposite valve seat.

Multiway valves of the type described above can be used particularly advantageously in refrigerating machines for refrigerators that have a plurality of evaporators for cooling compartments to be regulated separately, where they can be used for distributing a refrigerant stream to the various evaporators. In such a refrigerating machine, when one of the elements formed of form memory alloys is heated, refrigerant surrounding it will generally begin to boil, this resulting, in the first place, in a good thermal insulation of the element with respect to its surroundings. As soon as the element is no longer supplied with heating current, the evaporated refrigerant surrounding it is entrained by the stream flowing through the valve, so that the element comes into contact with liquid refrigerant and is rapidly cooled again. As soon as the element has cooled, a new switching operation is possible.

We claim:

1. A multiway valve, comprising:
    a housing having an inlet and a plurality of outlets and at least one common chamber formed therein;
    a plurality of seats each associated with one of said inlet or said outlets;
    a closing member movable between said seats and disposed in said housing;
    at least one actuator being an element formed of a form memory alloy, said element being capable, under heating, to displace said closing member onto one of said seats;
    a spring element for pressing said closing member against each of said seats occupied by said closing member in each case; and
    wherein said actuator is a curved body with a convex side facing said closing member, said curved body being lengthened under heating.

2. The multiway valve according to claim 1, wherein said spring element is a leaf spring.

3. The multiway valve according to claim 2, wherein said spring element has a plurality of stable positions, and said spring element presses said closing member against one of said seats in each of the stable positions.

4. The multiway valve according to claim 1, wherein said closing member is movable between two of said seats facing one another, and said spring element is capable of assuming two stable positions, said spring element having a convex curvature facing one of said seats in each of the stable positions.

5. A multiway valve, comprising:
    a housing having an inlet and a plurality of outlets and at least one common chamber formed therein;
    a plurality of seats each associated with one of said inlet or said outlets;
    a closing member movable between said seats and disposed in said housing;
    at least one actuator being an element formed of a form memory alloy, said element being capable, under heating, to displace said closing member onto one of said seats;
    a spring element for pressing said closing member against each of said seats occupied by said closing member in each case;
    said housing has a sidewall with one of said seats disposed therein;
    said spring element and said actuator are accommodated in said common chamber, said actuator is disposed between said sidewall of said housing and said spring element; and
    wherein said actuator has an orifice formed therein through which said closing member can be moved for closing or opening said seats.

6. The multiway valve according to claim 5, wherein:
    said housing has sidewalls; and
    two of said seats are disposed in diametrically opposite side walls of said housing.

7. A multiway valve, comprising:
    a housing having an inlet and a plurality of outlets and at least one common chamber formed therein;
    a plurality of seats each associated with one of said inlet or said outlets;

a closing member movable between said seats and disposed in said housing;

at least one actuator being an element formed of a form memory alloy, said element being capable, under heating, to displace said closing member onto one of said seats;

a spring element for pressing said closing member against each of said seats occupied by said closing member in each case;

an electrical heating device connected to said actuator for selective heating of said actuator; and wherein said heating device is a heating resistor extending on a surface of said actuator.

8. The multiway valve according to claim 7, wherein said heating device can be cooled in direct contact by a fluid flowing through the valve.

* * * * *